US008262228B2

(12) United States Patent
Picard et al.

(10) Patent No.: US 8,262,228 B2

(45) Date of Patent: Sep. 11, 2012

(54) LIGHT AND COLOR SURROUND

(75) Inventors: Dominique Picard, Saint Jeannet (FR); Charles Arnaud, Villenueve Loubet (FR); Philippe Gregoire, La Gaude (FR); Alexandre Van Gent, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 12/479,043

(22) Filed: Jun. 5, 2009

(65) Prior Publication Data

US 2010/0213873 A1 Aug. 26, 2010

(30) Foreign Application Priority Data

Feb. 23, 2009 (EP) .................................... 09305170

(51) Int. Cl.
*G03B 21/20* (2006.01)

(52) U.S. Cl. ................ 353/85; 353/15; 353/28; 353/20; 353/30; 353/31; 353/80; 353/81; 353/82; 353/83; 353/84; 353/86; 353/87; 353/119; 353/122

(58) Field of Classification Search .................... 353/15, 353/28, 20, 30, 31, 39, 80–87, 119, 122; 362/51, 555, 561, 582, 800, 86, 231, 295, 362/394, 811; 349/5, 7, 8, 9, 69, 61, 62; 348/798, 799, 800, 801, 802, 803; 700/17, 700/83, 19

See application file for complete search history.

(56) References Cited

U.S. PATENT DOCUMENTS

| | | | | |
|---|---|---|---|---|
| 5,459,376 | A | 10/1995 | Buij et al. | |
| 5,975,704 | A * | 11/1999 | Basey | 353/20 |
| 5,978,051 | A * | 11/1999 | Gohman et al. | 348/766 |
| 6,166,496 | A | 12/2000 | Lys et al. | |
| 6,289,165 | B1 * | 9/2001 | Abecassis | 386/224 |
| 6,349,261 | B1 | 2/2002 | Ohnishi et al. | |
| 6,564,108 | B1 * | 5/2003 | Makar et al. | 700/17 |
| 6,802,451 | B2 * | 10/2004 | Yavid et al. | 235/472.01 |
| 7,031,063 | B2 * | 4/2006 | Peterson et al. | 359/618 |
| 7,052,136 | B2 * | 5/2006 | Johnson | 353/15 |
| 7,059,726 | B2 * | 6/2006 | Engle | 353/81 |
| 7,204,622 | B2 | 4/2007 | Dowling et al. | |
| 7,271,964 | B2 * | 9/2007 | Rodriguez et al. | 359/750 |
| 7,401,925 | B2 * | 7/2008 | Lu | 353/31 |
| 2002/0186349 | A1 * | 12/2002 | Wichner et al. | 353/29 |
| 2003/0088872 | A1 * | 5/2003 | Maissel et al. | 725/46 |
| 2005/0071520 | A1 * | 3/2005 | Hull et al. | 710/8 |
| 2005/0265172 | A1 * | 12/2005 | Stankiewicz et al. | 369/47.16 |
| 2007/0265717 | A1 * | 11/2007 | Chang | 700/83 |
| 2009/0027620 | A1 * | 1/2009 | Lin et al. | 353/15 |

* cited by examiner

*Primary Examiner* — Georgia Y Epps
*Assistant Examiner* — Sultan Chowdhury
(74) *Attorney, Agent, or Firm* — Cuenot, Forsythe & Kim, LLC

(57) ABSTRACT

The present disclosure is directed towards a multimedia system comprising a multimedia reader. The multimedia reader may be configured to read multimedia content and to extract light surround content. The light surround content may represent a light surround control signal. The light surround content may be extracted from the multimedia content. The multimedia reader may also be configured to output the light surround control signal. Further, the multimedia system may also include one or more light emitting devices. Each light emitting device may be in communication with the multimedia reader. Each light emitting device may be configured to receive the light surround control signal and to control a light characteristic based upon, at least in part the light surround control signal. Numerous other embodiments are also within the scope of the present disclosure.

11 Claims, 5 Drawing Sheets

Media Track 200

LIGHT AND COLOR SURROUND

RELATED APPLICATION(S)

This application claims the benefit of European Patent Application Number 09305170.4 filed on 23 Feb. 2009, the entire contents of which are herein incorporated by reference.

TECHNICAL FIELD

This disclosure relates to a system and method for light and color surround. More specifically, this disclosure relates to a multimedia system configured to enhance the visual perception of a spectator viewing multimedia content by providing a more realistic and complete light and color experience.

BACKGROUND

In existing surround sound systems, sound may be linked to video and cinema film projections and output from several sound devices, often speakers. Surround sound systems are available for commercial applications such as movie theatres as well as for home video and cinema systems. Surround sound systems have drastically improved spectator perception and have provided an improved viewing experience by spacing sound throughout a desired sound environment.

While there has been some success in providing a surround sound system, there exists a need for improving spectator perception and providing a better viewing experience. None of the systems described above appear to provide a surround system for light and color. As such, further work is needed to improve spectator perception and provide a better simulation through a surround system for light and color.

SUMMARY OF DISCLOSURE

In a first implementation, a surround system for light and color may include a multimedia system. The multimedia media system may include a multimedia reader configured to read multimedia content. The multimedia reader may be further configured to extract light surround content, which may represent a light surround control signal. Further, the light surround content may be extracted from the multimedia content. The multimedia reader may be further configured to output the light surround control signal.

In some embodiments the multimedia system may also include one or more light emitting devices. Each light emitting device may be in communication with the multimedia reader and may be configured to receive the light surround control signal. Each light emitting device may be further configured to control a light characteristic based upon, at least in part, the light surround control signal.

One or more of the following features may be included. In some embodiments, the light emitting devices may control a light characteristic which may be light intensity. The light characteristic may also be light color. The light characteristic may further be light angle. In some embodiments, the light emitting devices may be configured to control multiple light characteristics.

The multimedia system may also include a projector. The projector may be configured to project images based upon, at least in part, the multimedia content. In one implementation, the multimedia reader of the multimedia system may be configured to read the multimedia content from a storage device.

In another implementation, the multimedia reader may be configured extract visual media content. The multimedia reader may also be configured extract audio media content. The multimedia reader may be further configured to output a visual control signal. Moreover, the multimedia reader may be configured to output an audio control signal.

In some embodiments, the multimedia content may include one or more tracks. Each track may represent light surround content. Further, each track may represent light surround content for one of the one or more light emitting devices. In another embodiment, communication between at least one of the one or more emitting devices and the multimedia reader may be wireless.

In other embodiments, the multimedia system may include a visual device configured to display images. The visual device may be configured to display images, based upon, at least in part, the multimedia content. Further, one or more light emitting devices of the multimedia system may be separately housed from the visual device. In one implementation, each light emitting device may be separately housed from the other light emitting devices.

Further, another implementation may be a method for a surround system for light and color. The method may comprise reading multimedia content. Multimedia content may be read with a multimedia reader. The method may further comprise extracting light surround content. The light surround content may represent a light surround control signal. The light surround content may be extracted from the multimedia content. The method may further comprise outputting the light surround control signal. Moreover, the method may comprise receiving the light surround control signal. The light surround control signal may be received at one or more light emitting devices. The method may further comprise controlling a light characteristic. The light characteristic may be controlled based upon, at least in part, the light surround control signal.

The method may include one or more of the following features. In some embodiments, the light emitting devices may control a light characteristic which may be light intensity. The light characteristic may also be light color. The light characteristic may further be light angle. In some embodiments, the light emitting devices may be configured to control multiple light characteristics. In one implementation, the multimedia reader may be configured to read multimedia content from a storage device.

The details of one or more implementations are set forth in the accompanying drawings and the description below. Other features and advantages will become apparent to those of ordinary skill in the art, from the description, the drawings, and the claims.

DETAILED DESCRIPTION OF THE PREFERRED EMBODIMENTS

Generally, the present disclosure relates to a surround system for light and color. The system may provide an enhanced light and color experience for a spectator when a film, or other video content, is viewed.

The system may enhance a spectator's experience by linking light and color emitted around a spectator with images and sounds in a film to emphasize the images and sounds. For example, a flash of white light may be emitted for a lightning scene to provide the light and color experience of lightning. Another example may be to emit little or no light for a night scene to provide the light and color experience of night. Other examples may include emitting a yellow light for a desert scene, blue light for a water scene, green light for a jungle scene, darkening blue light for a deep sea diving scene, etc.

In some embodiments, the system may provide an enhanced light and color experience by emitting light from several light emitting devices. The light emitting devices may be positioned or located around a film viewing environment, or other environment for viewing video content. The light emitting devices may be further positioned or located around the spectator, or around a visual device for displaying images, such as a television, projection screen, etc.

Each light emitting device may represent a light and color channel and may receive a track, signal, or other surround content. The content to be received by each light emitting device may be encoded or recorded with a film or video and sent to light emitting devices during the projection of the film or playing of the video. The content, e.g., light surround content, may include light surround tracks that define light through time for the entire length of a film or video. Additionally, each light emitting device may control light characteristics through time based upon, at least in part, a light surround control signal.

As used herein, the term "light characteristic" may refer to one or more of light intensity, light color, light angle, or any other quality, feature, trait, and/or attribute, that light may have. Further, as used herein, the term "signal" may refer to any physical quantity that can carry information. Some signal types may include, but are not limited to, analog, digital, continuous time, or discrete time signals.

Figure 1:
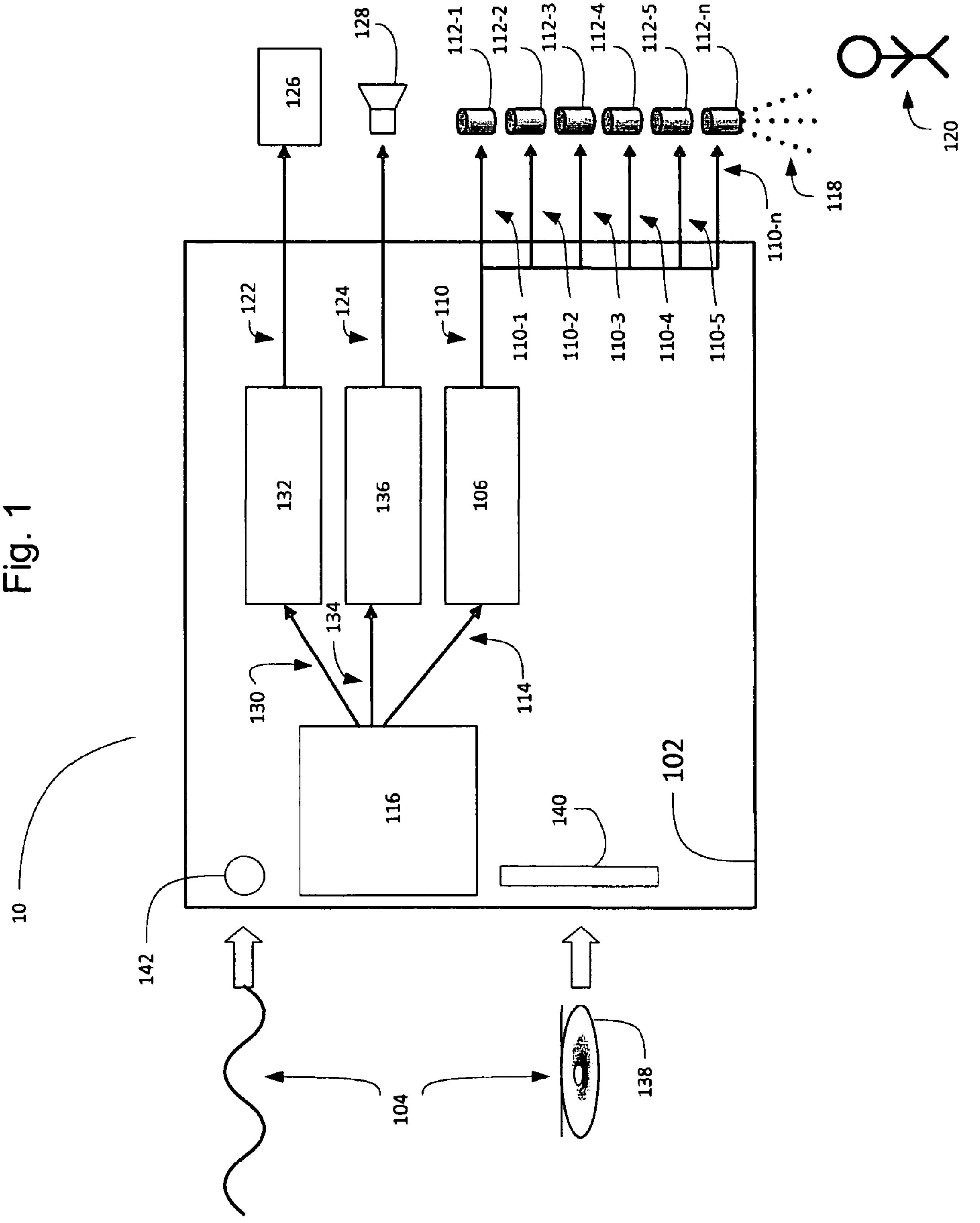
FIG. 1 is diagram showing a system in accordance with an embodiment of the present disclosure.

Referring now to FIG. 1, there is shown an exemplary multimedia system 10 in accordance with the present invention. Multimedia system 10 may include multimedia reader 102, which may refer to a single multimedia device or multiple multimedia devices. Multimedia reader 102 may be configured to read multimedia content 104, which is described in further detail hereinbelow.

Multimedia content 104 may include, but is not limited to compact discs (cd), digital video discs (dvd), blu-ray discs, cable television, internet feeds, etc. Multimedia content 104 may include visual media content 130, audio media content 134, light surround content 114, or any other video, audio, or photo content described herein, or any combination thereof. Multimedia content 104 may also be any other multimedia content or media content known or unknown to those of ordinary skill in the art, any multimedia content or media content developed in the future, or any combination thereof.

Moreover, multimedia reader 102 may be configured to read multimedia content 104 with read processor 116, which may be configured to extract or otherwise filter and/or separate each type of content from multimedia content 104. For example, read processor 116 may be configured to extract light surround content 114, video media content 130, and audio media content 134 from multimedia content 104. Additionally, read processor 116 may be configured to send video media content 130 to visual media content processor 132, audio media content 134 to audio media content processor 136, and light surround content 114 to light surround content processor 106. Read processor 116 may be any suitable device configured to process multimedia content 104.

As discussed above, in some embodiments, multimedia reader 102 may be configured to read light surround content 114. Light surround content 114 may be any track, information, or other content representing light surround control signal 110, which may be used to communicate with light emitting devices 112-1 to 112-*n*. Light surround content 114 may include any content for controlling one or more light emitting devices. Multimedia reader 102 may be further configured to send light surround content 114 to light surround content processor 106 for decoding light surround content 114. Light surround content processor 106 may be implemented in a variety of different arrangements such as software, hardware, or hybrid configurations.

Light surround content processor 106 may extract or otherwise filter or separate specific signals such as light surround control signal 110, or light surround control signals 110-1 to 110-*n* from light surround content 114. Light surround control signal 110 and light surround control signals 110-1 to 110-*n* may be used to control one or more of light emitting devices 112-1 to 112-*n*. Each light surround control signal, for example 110-1 to 110-*n*, may correspond to a light emitting device 112-1 to 112-*n*. It should be noted that light surround content processor 106 may be a light surround content decoder or other decoder. Light surround control signal 110 and light surround control signals 110-1 to 110-*n* may be included in multimedia content 104. Further, multimedia reader 102 may be configured to output light surround control signal 110, or light surround control signals 110-1 to 110-*n* in order to communicate with light emitting devices 112-1 to 112-*n*.

Light emitting devices 112-1 to 112-*n* may be any devices configured to emit light. For example, light emitting devices 112-1 to 112-*n* may be configured to operate with light emitting elements, which may include, but are not limited to light emitting diodes (LED's), light bulbs, incandescent light bulbs, light emitting electromechanical cells, light emitting pixels, lasers, filaments, light emitting gases, light emitting polymers, light emitting chemicals, and light emitting transistors.

Communication between light emitting devices 112-1 to 112-*n* and multimedia reader 102 may be wired, wireless, or may include any other communication known or unknown to those of ordinary skill in the art. For example, the wireless communication between light emitting devices 112-1 to 112-*n* and multimedia reader 102 may utilize intermediate frequency (IF), radio frequency (RF), amplitude modulation (AM), frequency modulation (FM), infrared (IR), wireless local area networks (WLAN), Institute of Electrical and Electronics Engineers (IEEE) 802.11, or any other wireless communication type or protocol known or unknown to those of ordinary skill in the art or developed in the future.

Each light emitting device 112-1 to 112-*n* may be configured to control one or more light characteristics (e.g., light characteristic 118) based upon the control signal received. Light emitting devices 112-1 to 112-*n* may control the one or more light characteristics (e.g., light characteristic 118) based upon, at least in part, light surround control signal 110 or light surround control signals 110-1 to 110-*n*. The one or more light characteristics (e.g., light characteristic 118) may be capable of being perceived by spectator 120.

In some embodiments, each light emitting device 112-1 to 112-*n* may be further configured to emit colors of light across an entire color spectrum, including, but not limited to, spectral colors and/or all colors in the visible spectrum, optical spectrum, and electromagnetic spectrum. Light emitting devices 112-1 to 112-*n* may further emit visible light, for example, light with a wavelength in air between about 380-

750 nanometers. However, light having a corresponding wavelength outside of this range may be used in accordance with this disclosure as well. Additionally, light emitting devices 112-1 to 112-*n* may emit light of any and/or all colors distinguishable by the human eye and brain. Light emitting devices 112-1 to 112-*n* may also emit light of unsaturated colors which may only be made by a mix of multiple wavelengths. Light emitting devices 112-1 to 112-*n* may further emit light in the color display (e.g. computer monitors or televisions) spectrum.

Moreover, light emitting devices 112-1 to 112-*n* may be separately housed from any visual device associated with multimedia system 10 or multimedia reader 102. As used herein, the term "separately housed" may mean unattached, individually enclosed, or otherwise unconnected or alone. Light emitting devices 112-1 to 112-*n* may further be separately housed from each other. It should be noted that while light emitting devices 112-1 to 112-*n* may be separately housed from any visual device associated with multimedia system 10 or multimedia reader 102, or separately housed from each other, the light emitting devices 112-1 to 112-*n* may still be in communication with, either wired or wirelessly, multimedia reader 102, and/or each other.

As discussed above, in some embodiments, light emitting devices 112-1 to 112-*n* may be specifically configured to operate with various components of multimedia system 10, such as, for example multimedia reader 102. Such exemplary light emitting devices may operate as light emitting devices for use in surround systems for light and color, and may be configured to emit light with any and/or all light characteristics described herein.

In other embodiments, light emitting devices 112-1 to 112-*n* may also be lamps or light fixtures configured to operate with surround systems for light and color. Light emitting devices 112-1 to 112-*n* that are lamps or light fixtures may be configured to operate with enhanced light bulbs. Enhanced light bulbs may be used with lamps or light fixtures in place of light bulbs that may emit light of only one color or intensity. Enhanced light bulbs may be configured to emit light with any and/or all light characteristics described herein. Further, lamps or light fixtures configured to operate system 10 may be further configured to control light characteristics based upon light surround control signal 110 or light surround control signals 110-1 to 110-*n*. Lamps or light fixtures configured to operate with surround systems for light and color may embody some or all features of light emitting devices 112-1 to 112-*n*.

In one implementation, multimedia reader 102 may be configured to extract or otherwise filter and/or separate visual media content 130 from multimedia content 104. Visual media content 130 may be or may represent images, video, photographs, animation, or any other viewable media content. Moreover, multimedia reader 102 may be further configured to send visual media content 130 to visual media content processor 132 for image processing. Visual media content processor 132 may be implemented by software, hardware, or both. In some embodiments, visual media content processor 132 may operate as a decoder or similar device.

Visual media content 130 may be in any of a variety of different formats, including, but not limited to, analog, digital, compressed, or uncompressed formats. For example, some specific formats may include, advanced television systems committee (ATSC) format, national television systems committee (NTSC) format, digital video broadcasting (DVB), integrated services digital broadcasting (ISDB), digital versatile disc or digital video disc (DVD), QuickTime, any moving picture experts group format (MPEG), video home system (VHS), Betamax, any phase alternating line standard (PAL), séquentiel couleur à mémoire or sequential color with memory (SECAM), standard-definition television (SDTV), high definition television (HDTV), blu-ray disc, high definition digital video disc (HD DVD), laserdisc, image maximum (IMAX), or any other format used in tape technology, disc technology, file storage technology, file compression technology, and commercial movie theatres.

Further, multimedia reader 102 may be configured to output visual control signal 122 to visual device 126. Visual device 126 may be any video device or display device capable of displaying images. For example, visual device 126 may be a television, monitor, or projector, including but not limited to, a cathode ray tube (CRT) television, CRT projector, flat panel display, light emitting diode (LED) display, LED projector, plasma display, plasma panel display (PDP), plasma television, liquid crystal display (LCD) television, film projector, movie projector, slide projector, digital projector, video projector, LCD projector, laser projector, digital light processor (DLP) television, DLP projector, liquid crystal on silicon (LCOS) projector, LCOS television, direct-drive image light amplifier (D-ILA) television, D-ILA projector, do it yourself (DIY) projector, or rear projection television. Numerous other visual devices are also envisioned without departing from the scope of the present disclosure.

In another implementation, multimedia reader 102 may be configured to extract or otherwise filter and/or separate audio media content 134 from multimedia content 104. Audio media content 134 may be or may represent any sound, noise, song, speech, soundtrack, or any combination thereof. Moreover, multimedia reader 102 may be further configured to send audio media content 134 to audio media content processor 136 for audio processing. Audio media content processor 136 may be implemented by software, hardware, or both. In some embodiments, audio media content processor 136 may include a decoder or similar device.

Audio media content 134 may be in any suitable format such as analog, digital, compressed, and/or uncompressed formats. For example, audio media content 134 may be a waveform audio format (WAV), interchange file format (IFF), audio interchange file format (AIFF), resource interchange file format (RIFF), moving picture experts group-1 audio layer 3 (MP3), compact disc (CD), digital video disc (DVD), free lossless audio codec (FLAC), Windows Media Audio (WMA), audio units (AU), WavPack (WV), true audio TTA, advanced audio coding (AAC), Red Book, or compact disc digital audio (CDDA). Audio media content 134 may also be encoded, decoded, compressed, or uncompressed using any known standard or any future methods.

Further, multimedia reader 102 may be configured to output audio control signal 124 to audio device 128. Audio device 128 may be any transducer configured to convert an electrical signal to sound. For example, audio device 128 may include a speaker, loudspeaker, analog speaker, digital speaker, or speaker system. Further, audio device 128 may include any audio device including, but not limited to any driver, full-range driver, woofer, subwoofer, mid-range driver, mid-range speaker, tweeter, or super-tweeter.

In one implementation, multimedia reader 102 may include an input 140 for storage device 138. Storage device 138 may include multimedia content 104, which, as discussed above, may include, but is not limited to light surround control content 114, visual media content 130, audio media content 134, or any other track, information, or content. Multimedia content 104 may be stored on storage device 138. Multimedia reader 102 may read multimedia content 104 from storage device 138. Storage device 138 may be any readable disc, tape, memory, etc. For example, storage device 138 may be any device including but not limited to a compact disc (CD), digital video disc (DVD), blu-ray disc, high definition digital video disc (HD DVD), laserdisc, video home system (VHS), Betamax, disc film, semiconductor firmware memory, programmable memory, non-volatile memory, read-only memory, electrically programmable memory, random access memory, flash memory (which may include, for example, NAND or NOR type memory structures), magnetic disk memory, and/or optical disk memory. Either additionally or alternatively, memory may comprise other and/or later developed types of computer-readable memory or electronically readable memory. Storage device 138 may also include other and/or later developed types of computer-readable discs or tapes or otherwise electronically readable discs or tapes.

In another implementation, multimedia reader 102 may receive multimedia content 104 from input 142. Input 142 may be configured to receive any signal, signal type, input-type, or connector including, but not limited to, a cable signal, a cable signal from a coaxial cable, a satellite signal, a high definition multimedia interface (HDMI) signal, a component video signal, an antenna signal, a signal from a cable box, a signal traveling through Radio Corporation of America (RCA) cables, RCA plugs for composite video and stereo audio, a signal from a digital video recorder (DVR), a digital visual interface (DVI) signal, a separated video (s-video) signal, a network signal from a router, cable modem or other modem, a signal from a universal serial bus (USB) connector, or a signal from a media player configured to read multimedia content 104 from any of the storage devices discussed above. Further, input 142 may accept tracks, content, information, or signals from a video game console, personal computer, or server. In this way, multimedia system 10 may receive multimedia content 104, light surround content 114, visual media content 130, and/or audio media content 134, individually, or in any combination thereof, at multimedia reader 102 and provide the necessary processing or decoding before transmitting these signals to one or more of light emitting devices 112-1 to **112-*n*, visual device 126, and audio device 128**.

Figure 2:
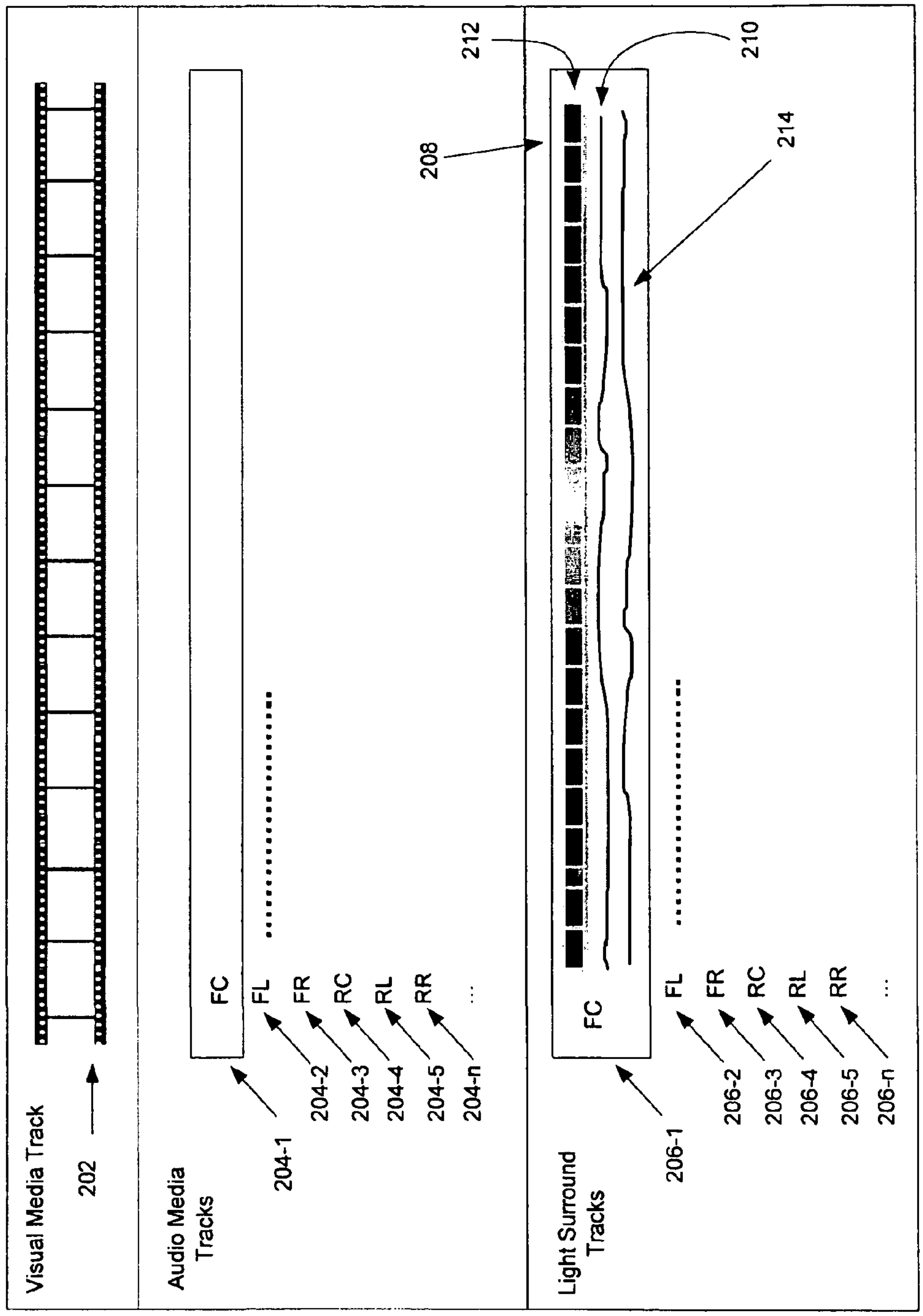
FIG. 2 is a diagram showing a media track in accordance with an embodiment of the present disclosure.

Referring now to FIG. 2, media track 200, which may include light surround tracks 206-1 to **206-*n*, visual media track 202, and audio media tracks 204-1 to 204-*n*, is shown. Multimedia content 104 may include media track 200**.

Multimedia content 104 may include a light surround track 206-1 to **206-*n* for each light emitting device 112-1 to 112-*n*. Further, light surround tracks 206-1 to 206-*n* may be included in light surround content 114, and may be processed by light surround content processor 106. Light surround tracks 206-1 to 206-*n* may correspond to each light emitting device 112-1 to 112-*n*. For example, light surround track 206-1 may be processed by light surround content processor 106 and may be sent to light emitting device 112-1. After processing, light surround track 206-1 may be in the form of light surround control signal 110-1. Moreover, light surround tracks 206-1 to 206-*n* may be embedded and/or included within storage device 138 and, more specifically multimedia content 104**.

Furthermore, multimedia content 104 may further include a visual media track 202. Further, visual media track 202 may be included in visual media content 130 and may be processed by visual media content processor 132. Visual media track 202 may be sent to visual device 126. After processing, visual media track 202 may be in the form of visual control signal 122. Moreover, visual media track 202 may be embedded and/or included within storage device 138 and, more specifically multimedia content 104.

Additionally, multimedia content 104 may include an audio media track 204-1 to **204-*n* for multiple audio devices, one of which may be audio device 128. Further, audio media tracks 204-1 to 204-*n* may be included in audio media content 134, and may be processed by audio media content processor 136. Audio media tracks 204-1 to 204-*n* may correspond to multiple audio devices, one of which may be audio device 128. For example, audio media tracks 204-1 to 204-*n* may be processed by audio media content processor 136 and may be sent to audio device 128. Audio device 128 may be, for example, a subwoofer. After processing, audio media track 204-1 to 204-*n* may be in the form of audio control signal 124. Moreover, audio media tracks 204-1 to 204-*n* may be embedded and/or included within storage device 138 and, more specifically multimedia content 104**.

In one implementation light surround tracks 206-1 to **206-*n* may include coding 208, which may be included in multimedia content 104 and may represent light surround content 114, light surround control signal 110, or light surround control signals 110-1 to 110-*n*. Coding 208 may represent a variation in one or more light characteristics (e.g. light characteristic 118**).

In some embodiments, coding 208 may allow light emitting devices 112-1 to **112-*n* to control light characteristics including light intensity 210, light color 212, and light angle 214 through multimedia content 104, light surround content 114, light surround control signal 110, and/or light surround control signals 110-1 to 110-*n***.

In some embodiments, coding 208 may represent variation in light intensity 210. Light intensity 210 may be measured and calculated by any known method and in any known units. Light intensity may be, but is not limited to, radiant intensity, luminous intensity, irradiance, radiance, or brightness. Light intensity may be calculated in watts per steradian, lumens per steradian, candela, or watts per meter squared. It should be noted that light emitting devices 112-1 to **112-*n*** may be configured to emit light of any intensity, measure of intensity, calculation of intensity, or unit of intensity described herein, or any intensity, measure of intensity, calculation of intensity, or unit of intensity known or unknown to those of ordinary skill in the art.

In other embodiments, coding 208 may represent a variation in light color 212. Light color 212 may be any color of which light emitting devices 112-1 to **112-*n*** may be configured to emit. As discussed above, these colors may include, but are not limited to, all colors in the visible spectrum, optical spectrum, and electromagnetic spectrum, visible light, typically corresponding to light with wavelengths in air between about 380-750 nanometers, any and/or all colors distinguishable by the human eye and brain, unsaturated colors which may only be made by a mix of multiple wavelengths, and light in the color display (e.g. computer monitors or televisions) spectrum. However, colors having a corresponding wavelength in air outside of 380-750 nanometers may be used in accordance with this disclosure as well.

Further, coding 208 may represent a variation in light angle 214, i.e., the angle at which light is projected. It should be noted that light emitting devices 112-1 to **112-*n* may emit light in any and all directions simultaneously and may include pulsing via intermittent and continuous controls. As such, coding 208 may also represent variation in light intensity 210, light color 212, and light angle 214 for each light surround track 206-1 to 206-*n***.

Light surround tracks 206-1 to **206-*n* may be defined manually by a spectator or other user of multimedia system 10. Light surround tracks 206-1 to 206-*n* may also be defined manually by a producer, director, designer, or audio/visual expert involved in producing or making multimedia content 104. It should be noted that light surround content 114, light surround control signals 110-1 to 110-*n* and light surround tracks 206-1 to 206-*n*** may be included in any multimedia content such as films, television shows, short films, documentaries, songs, soundtracks, photographs, video games, or any other entertainment program, and are within the scope if this disclosure.

Further, light surround tracks 206-1 to **206-*n* may be defined automatically by a specific preprocessing phase. The preprocessing phase may be executed by a preprocessor or processor, and may be implemented using software, hardware, or both. In other words, defining light surround tracks 206-1 to 206-*n* may be an automated process. Defining light surround tracks 206-1 to 206-*n* may be automated by a pre-processing phase. The pre-processing phase may be implemented via software, hardware, or both software and hardware. Both manual and automatic definition of light surround tracks 206-1 to 206-*n* may include creating coding 208**.

Any of the aforementioned light characteristics described herein, i.e., light intensity, light color, and light angle, may be synchronized with images and sounds of multimedia content 104. More specifically, light surround content 114, light surround control signal 110, or light surround control signals 110-1 to **110-*n* representing light intensity, light color, and/or light angle may be synchronized with visual control signal 122, audio control signal 124, or both. Further, light surround control signal 110, light surround control signals 110-1 to 110-*n*, visual control signal 122, and audio control signal 124** may be sent in a synchronous mode such that variation in light characteristics occurs with images and sounds to emphasize the images and sounds and enhance the spectator experience.

The light characteristics described herein may also be controlled by sampling different values of the characteristics through time. Further, special sampling methods may be used to control light characteristics by assigning a value to a light characteristic based on an image or sound.

Figure 3:
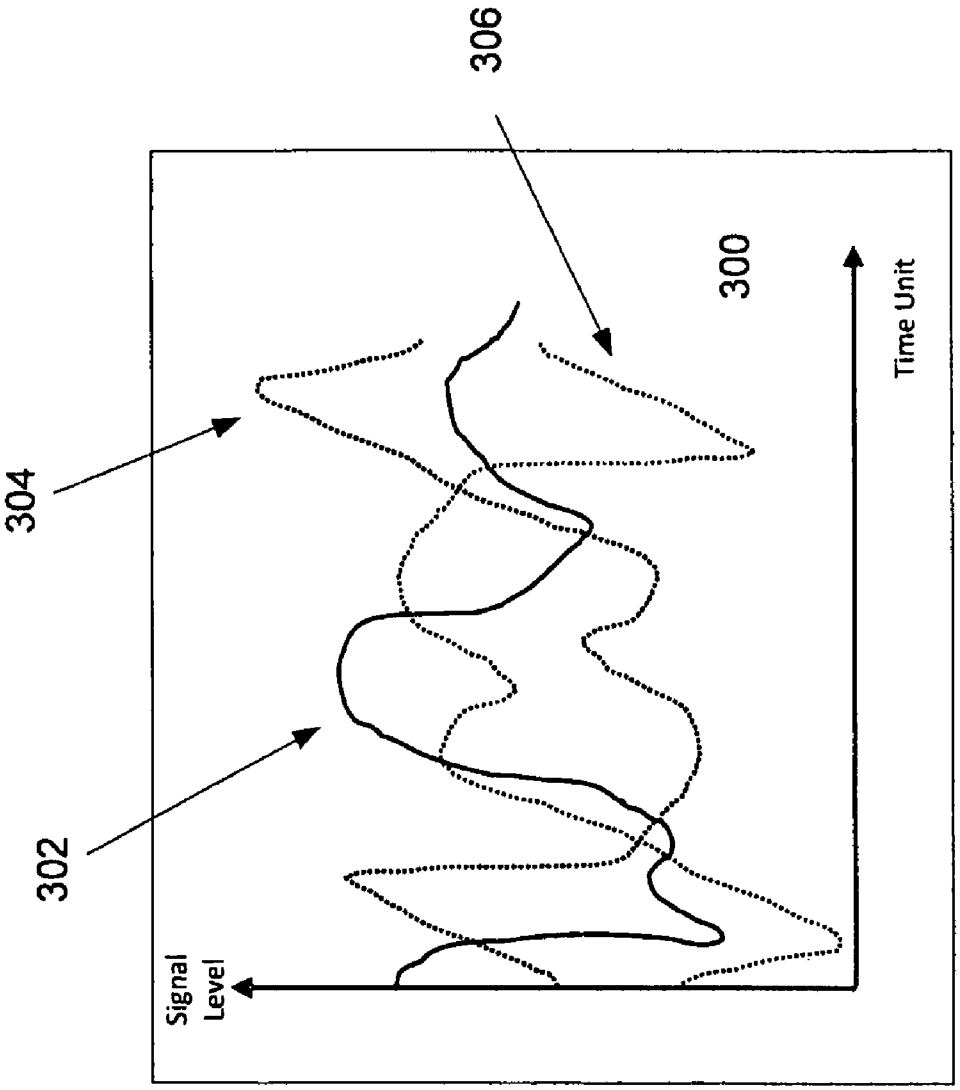
FIG. 3 is a graph showing a light surround control signal in accordance with an embodiment of the present disclosure.

Referring now to FIG. 3, graph 300 shows an exemplary embodiment of a light surround control signal 110-1 to **110-*n*. A light surround control signal 110-1 to 110-*n* may include light surround intensity control signal 302, light surround color control signal 304, and light surround angle control signal 306. Coding 208 may also represent light surround intensity control signal 302, light surround color control signal 304, and light surround angle control signal 306. Light surround intensity control signal 302, light surround color control signal 304, and light surround angle control signal 306** may vary as a function of time.

Figure 4:
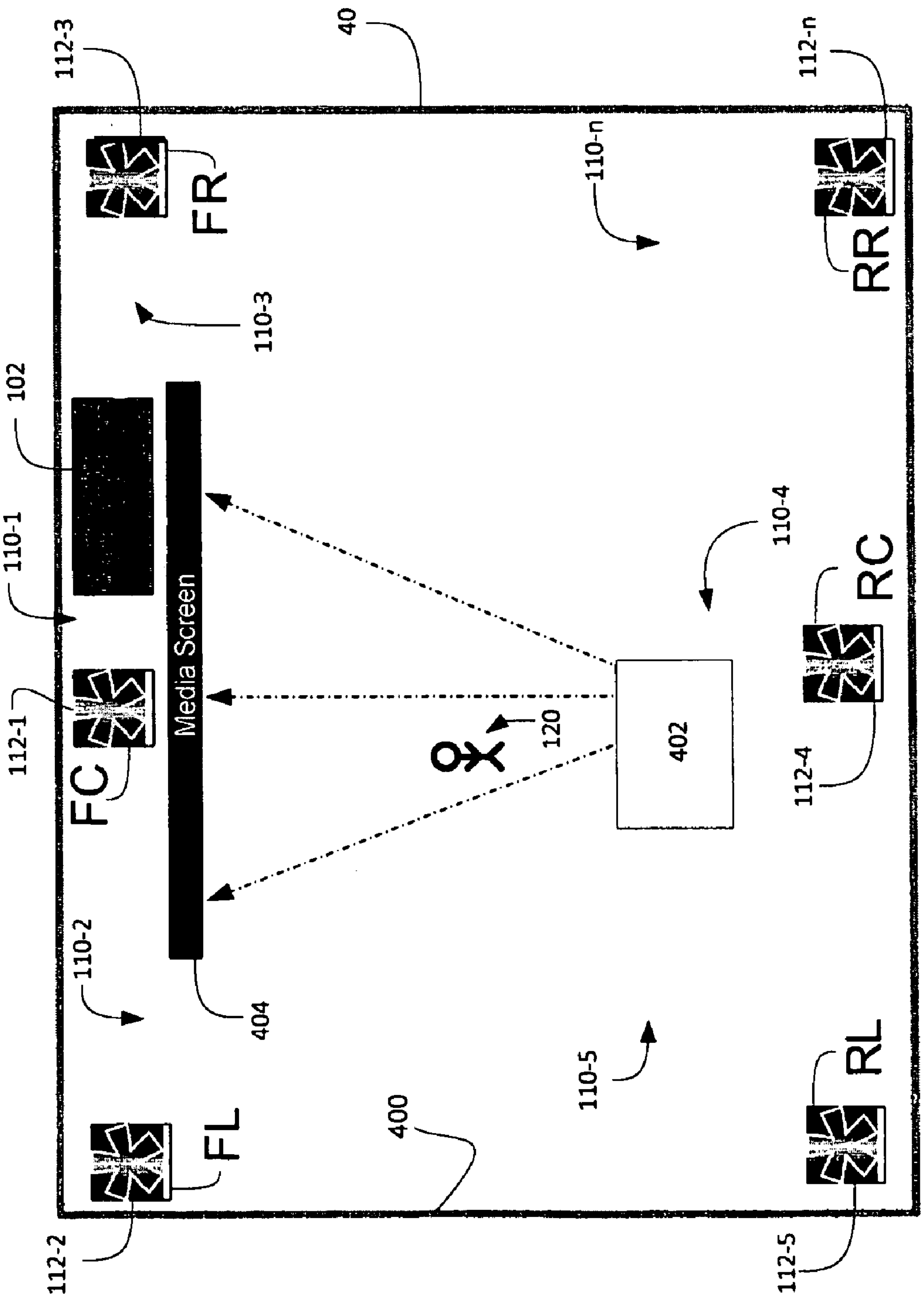
FIG. 4 is a diagram showing an implementation of a multimedia system in accordance with an embodiment of the present disclosure.

Referring now to FIG. 4, light emitting devices 112-1 to **112-*n* may be located and/or identified in a given area. The general location of light emitting devices 112-1 to 112-*n* may be based on a channel designation for each light emitting device 112-1 to 112-*n*. For example, general locations for light emitting devices 112-1 to 112-*n* may be, but are not limited to: Front-Center (FC), Front-Left (FL), Front-Right (FR), Rear-Center (RC), Rear-Left (RL), and Rear-Right (RR). The general location may be based upon, or use as a reference, the location of projector 402, media screen 404, visual display 126 as shown in FIG. 1, or spectator 120. Further, each light surround track 206-1 to 206-*n* (not shown in FIG. 4**) may correspond to a general location in a given area: Front-Center (FC), Front-Left (FL), Front-Right (FR), Rear-Center (RC), Rear-Left (RL), and Rear-Right (RR).

For example, light surround track 206-1 may correspond to FC, and FC may correspond to light emitting device 112-1. In this example, light surround track 206-1 may control light characteristics of light emitted by light emitting device 112-1. Also, light surround track 206-1 may be in the form of light surround control signal 110-1 after being processed by light surround content processor 106. Similarly, light surround track 206-2 may correspond to FL, and FL may correspond to light emitting device 112-2. In some embodiments, light surround track 206-2 may control light characteristics of light emitted by light emitting device 112-2. Moreover, light surround track 206-2 may be in the form of light surround control signal 110-2 after being processed by light surround content processor 106.

Further, light surround track 206-3 may correspond to FR, and FR may correspond to light emitting device 112-3. In this example, light surround track 206-3 may control light characteristics of light emitted by light emitting device 112-3. Also, light surround track 206-3 may be in the form of light surround control signal 110-3 after being processed by light surround content processor 106. Moreover, light surround track 206-4 may correspond to RC, and RC may correspond to light emitting device 112-4. In that example, light surround track 206-4 may control light characteristics of light emitted by light emitting device 112-4. Also, light surround track 206-4 may be in the form of light surround control signal 110-4 after being processed by light surround content processor 106. Furthermore light surround track 206-5 may correspond to RL, and RL may correspond to light emitting device 112-5. In that example, light surround track 206-5 may control light characteristics of light emitted by light emitting device 112-5. Also, light surround track 206-5 may be in the form of light surround control signal 110-5 after being processed by light surround content processor 106. Additionally, light surround track **206-*n* may correspond to RR, and RR may correspond to light emitting device 112-*n*. In some embodiments, light surround track 206-*n* may control light characteristics of light emitted by light emitting device 112-*n*. Also in that example, light surround track 206-*n* may be in the form of light surround control signal 110-*n* after being processed by light surround content processor 106**.

In one implementation, the general location in a given area for light emitting devices 112-1 to **112-*n* may be identified by a spectator or other user of multimedia system 10. As discussed above, the general location for light emitting devices 112-1 to 112-*n* may be based upon, or use as a reference, the location of visual device 126, media screen 404, or spectator 120. General locations may also be recommended by a designer or manufacturer of multimedia system 10 or by a producer, director, or audio/visual expert involved in producing or making multimedia content 104**.

In another implementation, the visual device 126 of multimedia system 10 may be a projector 402 as in multimedia system 40. Projector 402 may be configured to project images associated with multimedia content 104. Projector 402 may be any projector known or unknown to those of ordinary skill in the art or any future systems or methods of projection. When projected by projector 402, images associated with multimedia content 104 may be a film, movie, or other video content. More specifically, projector 402 may be configured to project images associated with visual media content 130 or visual control signal 122. Projector 402 may include visual media content processor 132 or another image processor for image processing. Image processing may be implemented by hardware, software, or both.

Projector 402 may be further configured to project images associated with multimedia content 104, visual media content 130, or visual control signal 122 onto media screen 404. Media screen 404 may be any projector screen, or any other screen for displaying a projected image. Projector 402 and media screen 404 may include, but are not limited to, any combination of projectors and screens used for home, business, cinema/movie theatres, indoor, or outdoor use.

Figure 5:
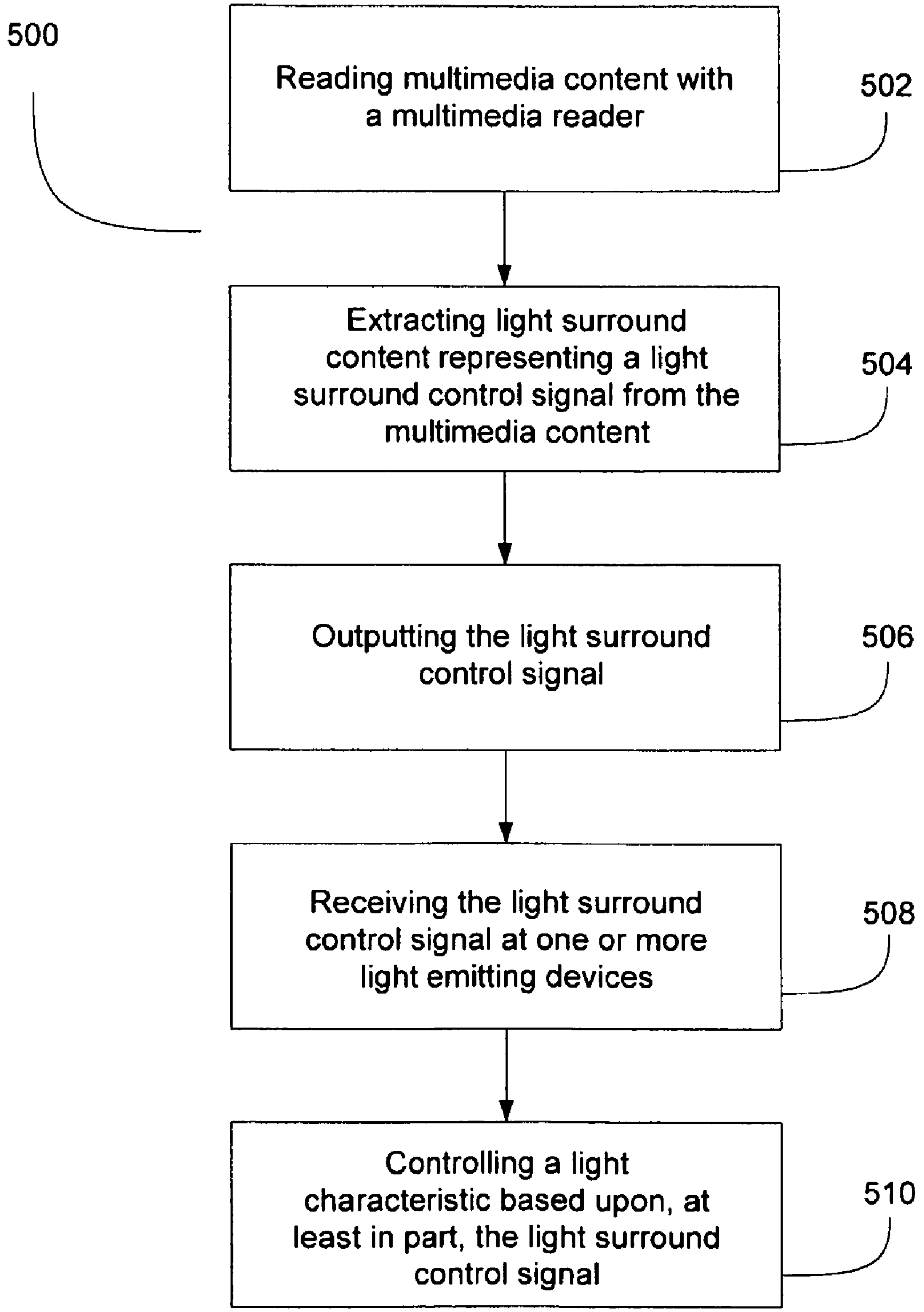
FIG. 5 is a diagram showing a method in accordance with an embodiment of the present disclosure.

Referring now to FIG. 5, an exemplary method 500 of practicing the present disclosure is shown. A method of practicing the present disclosure may include reading multimedia content 104 (502). The method may also include extracting light surround content 114 (504). The method may further include outputting light surround control signal 110 (506). Moreover, the method may include receiving the light surround control signal 110 at one or more light emitting devices (508). Additionally, the method may include controlling one or more light characteristics (e.g. light characteristic 118) based upon, at least in part, the light surround control signal (510). Other operations are also within the scope of the present disclosure.

As discussed above, the multimedia system may include a multimedia reader. The multimedia reader may refer to a multimedia device or multimedia devices including multiple components. Components of the multimedia reader may be configured to have or receive an input or multiple inputs. The inputs may be for receiving a storage device, media, media content, data, or signals. Other components included in the multimedia reader may be an encoder, decoder, codec, processor, receiver, and amplifier. The multimedia reader may further include outputs for sending media, media content, data, or signals.

The receiver or receivers of multimedia system 10 or multimedia reader 102 may be any radio receivers, digital media receivers, audio/visual receivers, satellite television receivers, and superheterodyne receivers. The processor or processors of the multimedia system 10 or multimedia reader 102 may be any central processing units, multi-core processors, complex instruction set computer (CISC) processors, reduced instruction set computer (RISC) processors, microprocessors, graphics processing units, rendering devices for personal computers, rendering devices for game consoles, video processing units, signal processors, analog signal processors, digital signal processors, network processors, front end processors, coprocessors, arithmetic logic units, and audio processors. The amplifier or amplifiers of the multimedia system 10 or multimedia reader 102 may be any power amplifiers, vacuum tube amplifiers, transistor amplifiers, operational amplifiers (op-amps), fully differential amplifiers, video amplifiers, oscilloscope vertical amplifiers, distributed amplifiers, microwave amplifiers, magnetic amplifiers, mechanical amplifiers, and optical amplifiers.

A number of implementations and embodiments have been described. Nevertheless, it will be understood that various modifications may be made. Accordingly, other implementations are within the scope of the following claims.

What is claimed is:

1. A multimedia system, comprising:

a multimedia reader configured to read multimedia content, extract light surround content representing a light surround control signal from the multimedia content, and output the light surround control signal; and one or more light emitting devices, each light emitting device in communication with the multimedia reader, each light emitting device configured to receive the light surround control signal and to control a light characteristic based upon, at least in part, the light surround control signal, wherein the light characteristic is light angle.

2. The multimedia system of claim 1, further comprising:

a projector configured to project images based upon, at least in part, the multimedia content.

3. The multimedia system of claim 1, wherein the multimedia reader is further configured to:

read the multimedia content from a storage device.

4. The multimedia system of claim 1 wherein the multimedia reader is further configured to:

extract at least one of visual media content and audio media content; and output at least one of a visual control signal and an audio control signal.

5. The multimedia system of claim 1, wherein:

the multimedia content includes one or more tracks, each track representing light surround content for one of the one or more light emitting devices.

6. The multimedia system of claim 4, wherein:

the communication between at least one of the one or more light emitting devices and the multimedia reader is wireless.

7. A method, comprising:

reading multimedia content with a multimedia reader;

extracting light surround content representing a light surround control signal from the multimedia content;

outputting the light surround control signal;

receiving the light surround control signal at one or more light emitting devices; and controlling a light characteristic based upon, at least in part, the light surround control signal, wherein the light characteristic is light angle.

8. The method of claim 7, wherein the multimedia reader is configured to:

read multimedia content from a storage device.

9. A multimedia system, comprising:

a multimedia reader configured to read multimedia content, extract light surround content representing a light surround control signal from the multimedia content, and output the light surround control signal;

a visual device configured to display images based upon, at least in part, the multimedia content; and one or more light emitting devices separately housed from the visual device, each light emitting device separately housed from the other light emitting devices, each light emitting device in communication with the multimedia reader, each light emitting device configured to receive the light surround control signal and to control a light characteristic based upon, at least in part, the light surround control signal, wherein the light characteristic is light angle.

10. The multimedia system of claim 9, wherein the multimedia reader is further configured to:

read the multimedia content from a storage device.

11. The multimedia system of claim 9, wherein:

the communication between at least one of the one or more light emitting devices and the multimedia reader is wireless.

* * * * *